CUTTERS FOR PLANER CHIPPER WOODWORKING MACHINES

Filed Jan. 26, 1959 4 Sheets-Sheet 1

INVENTOR.

George M. Standal

BY Grahl Wells

Atty.

INVENTOR.
George M. Standal
BY [signature]
Atty.

Jan. 26, 1960 G. M. STANDAL 2,922,448

CUTTERS FOR PLANER CHIPPER WOODWORKING MACHINES

Filed Jan. 26, 1959 4 Sheets-Sheet 3

INVENTOR.

George M. Standal

BY Freck Wells

Atty.

Jan. 26, 1960 G. M. STANDAL 2,922,448

CUTTERS FOR PLANER CHIPPER WOODWORKING MACHINES

Filed Jan. 26, 1959 4 Sheets-Sheet 4

INVENTOR.

George M. Standal

BY

Fred Wales

Atty.

2,922,448

CUTTERS FOR PLANER CHIPPER WOOD-WORKING MACHINES

George M. Standal, Chemainus, British Columbia, Canada

Application January 26, 1959, Serial No. 789,144

5 Claims. (Cl. 144—219)

My invention relates to cutters for planers for chipping off the surplus wood from boards that are to be given a smooth surface. The purpose of my invention is to provide a cutter which will take off the surplus wood in chip form by cutting the surplus wood across the grain with a shearing action. This application is a continuation in part of my application, Ser. No. 681,801, filed September 3, 1957, now Patent No. 2,884,031, issued on April 28, 1959, for Woodworking Chipping and Planing Machine with Cutter Head and Cutter Blades Therefor.

In finishing boards to give them a smooth surface it is common to use planers that move lengthwise of the board to take off thin shavings. When a board is to be given a smooth surface it is necessary to remove the wood at the surface to a depth to substantially eliminate the unevenness and broken grain wood that results from the sawing. Therefore it is customary to remove a substantial thickness. My invention is directed to a cutter which will make this initial removal by cutting across the board transversely to its length with a shearing action which does not tear up the grain of the wood. More particularly it is the purpose of my invention to provide a new cutter which slices the wood crosswise of the board and avoids tearing up the grain to any appreciable extent where the grain is crooked or distorted as around knots.

My invention is embodied in a machine which utilizes a multiplicity of cutters that are mounted upon a rotating head which rotates on an axis that is substantially perpendicular to the surface of the board being planed. The axis of rotation of the head is given a slight angle to the perpendicular so that the cutter which first strikes the board will not again strike it at the back side of the head. The board is forced past the cutter head by feed rolls which are synchronized with the rotation of the cutter head to determine the length of cut that will be made by each tooth. The machine utilizes anvils at the edge of the board toward which the working cutters are moving so that the board is held firmly against the force of the cutters. The cutters serve to remove the cut chips and throw them out to a hopper which is provided with a conveyor beneath its bottom outlet to carry the chips away.

The nature and advantages of my invention will appear more fully from the following description and the accompanying drawings wherein a preferred form of the invention is illustrated. The drawings and description, however, are illustrated only and are not intended to limit the invention except insofar as it is limited by the claims.

Figures 1, 17, 18, 19:
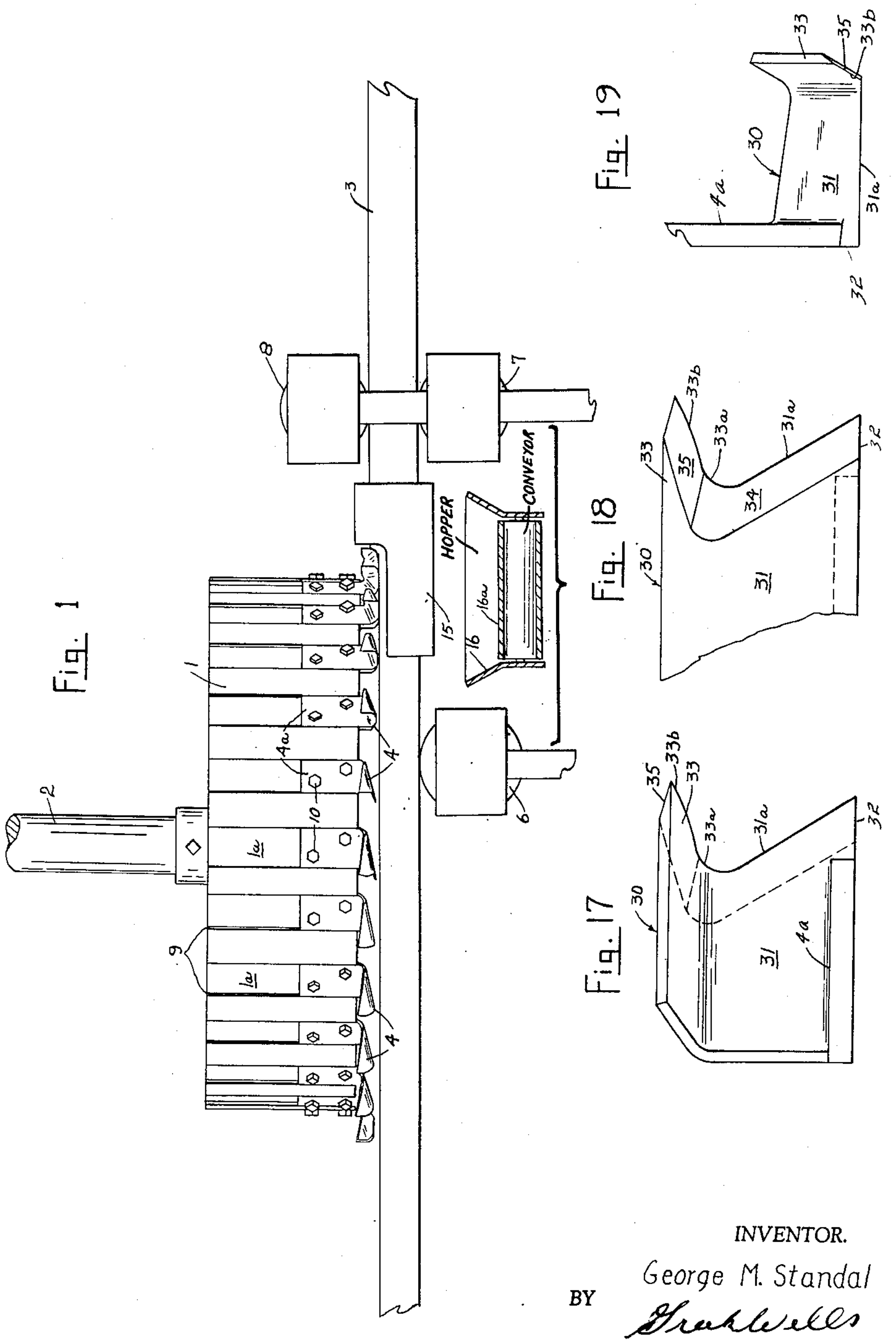
Figure 1 is a side view of a cutter head and the associated parts, the head being equipped with my improved cutters.
Figure 17 is a plan view of another form of cutter.
Figure 18 is a bottom plan view of the cutter shown in Figure 17.
Figure 19 is a front end view of the cutter shown in Figure 17.
Figure 2:
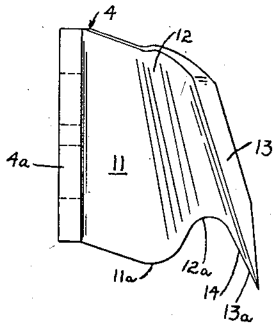
Figure 2 is a plan view of a cutter.
Figure 3:
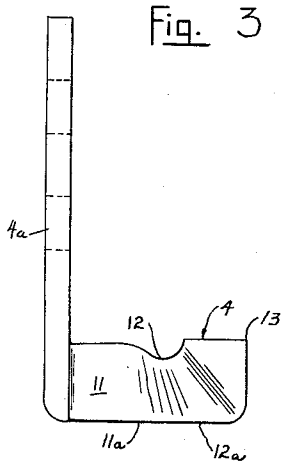
Figure 3 is a front view of the cutter.
Figure 4:
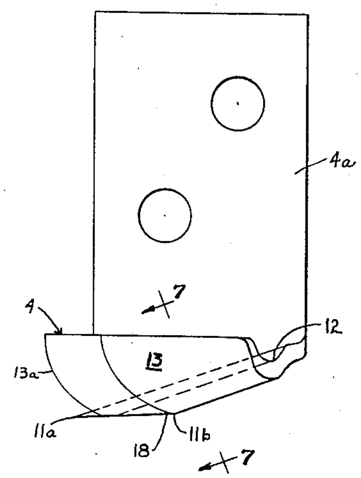
Figure 4 is a side view of the cutter looking at Figure 3 from the right hand side.
Figure 5:
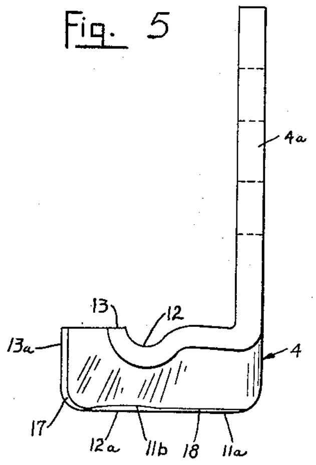
Figure 5 is a rear view of the cutter.
Figure 6:
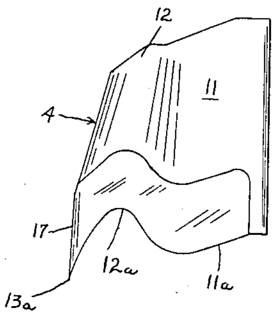
Figure 6 is a bottom view of the cutter.
Figure 7:
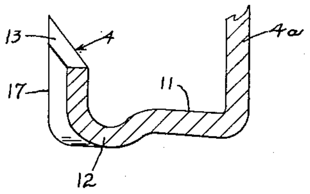
Figure 7 is a fragmentary sectional view taken on the line 7—7 of Figure 4.
Figures 8, 9:
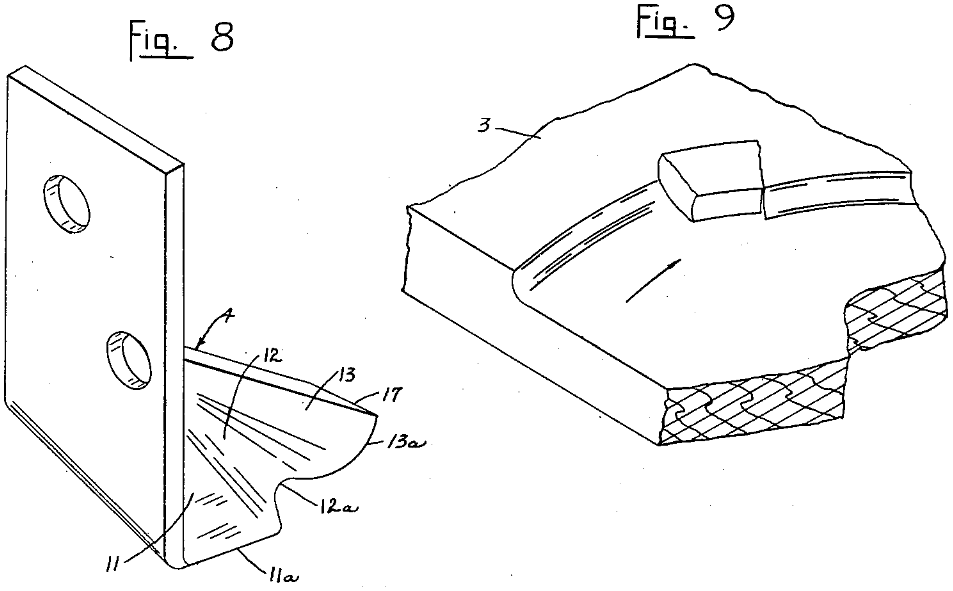
Figure 8 is a perspective view of the cutter illustrating the contour of the cutting edge.
Figure 9 is a fragmentary perspective view of a piece of board illustrating the cut made by the cutter.

My invention as shown in Figure 1, embodies a cutter head 1 which is rotated by a drive shaft 2. In order to hold a board 3 against movement away from the cutters 4 on the cutter head 1, an anvil 15 is mounted to engage the side edge of the board toward which the cutters tend to force the board. The mounting of the head 1 is such that the axis of rotation of the head is substantially perpendicular to the top surface of the board 3 passing over the rollers 6 and 7 and under roller 8. However, in order to insure clearance of the board beneath the cutters as the board leaves the head 1, the axis of the cutter head 1 may be inclined slightly to the perpendicular so as to keep the board 3 from contacting the cutters after it has been trimmed. Figure 1 shows the head 1 as being provided with peripheral slots 9 in its skirt 1*a*. These slots provide guides for shanks 4*a* of the cutters 4 and the cutters are held in position by screws 10 that are threaded into the skirt 1*a*. Each cutter, as illustrated in detail in Figures 2 to 8, comprises a base portion 11 that is angularly disposed with respect to the shank 4*a*, and which extends outwardly and upwardly from the shank 4*a*, but makes an angle upwardly from the advancing edge 11*a* to the rear edge 11*b* of 25 to 35 degrees with respect to a plane perpendicular to the axis of the head 1 on which the cutter is mounted. The cutter actually works better with a lesser angle but in order to have sufficient strength in the cutter edge, the angle must be increased for weaker steel.

Outwardly from the portion 11 of the cutter 4, the cutter 4 is curved down or depressed as indicated at 12 and is then turned upwardly to provide a nose portion 13 that extends substantially above the base portion 11. The depression 12 and the nose 13 are not parallel to the shank 4*a* but approach the shank 4*a* from their front ends to their rear ends. The bottom faces of portions 11 and 12, that is, the faces toward the board, are ground off flat to sharpen the advancing edge 11*a* and form the advancing edge 12*a* into a concave cutting edge, the outer tip of which joins the advancing edge 13*a* of the nose 13. The nose 13 is ground off on its outer surface to sharpen its advancing edge 13*a*. The slight upward angle of the portion 11 with respect to a plane perpendicular to the shank 4*a* causes the edge 11*a* to advance, with respect to a radial line from the axis of the cutter through the front edge of shank 4*a*, outwardly from the shank 4*a*, to where the down curve from 11 to 12 occurs. The advancing edge of the cutter curves back and crosses the radial line to provide a convex cutting edge portion 14 between the straight edge 11*a* and the concave edge 12*a*. The advancing edge as it extends up the outer section of the depression 12 advances again with respect to the radial line to bring the cutting edge portion 13a in front of the radial line.

The cutting edges just described place the tip portion 13a ahead most at the top, so that in cutting across the wood the fibers are first severed at the top of the board and the edge 14 is next to engage. The wood is sliced progressively from these two places to the rearmost portions of the edges 12a and 11a. This particular slicing action minimizes the splitting of the wood along grain lines.

The chips removed by the cutters are lifted and thrown forward by the inclined top surface into a hopper 16 at the side of the machine for delivery upon a conveyor 16a. The speed of the head 1 is synchronized with the speed at which the board 3 is fed through the machine so that each cutter will slice off a chip of a certain length. For a certain speed of advance of the board a cutter head having a given spacing of teeth will cut chips of a given length.

The advancing face of the nose portion 13 of the cutter 4 must have a "lead" angle great enough to accommodate the board travel. This lead angle is illustrated best in Figures 2 and 5 where the surface 17 is so ground as to give the necessary back clearance. It is also necessary to provide a very slight back clearance on the bottom face of the cutter 4 behind the cutting edges. This clearance is illustrated at 18 in Figures 4 and 5 of the drawings. The back clearances on the surfaces 17 and 18 are of the order of a few degrees. For example, with the board travel and cutter speed referred to before, if the surface 17 extends one-half inch back from the edge 13a, the rear edge of the surface 17 must be cut back more than one-twelfth inch to accommodate the board advance. Otherwise the rear edge of the surface 17 would oppose advance of the board. The clearance of the surface 18 is much less. It is only needed to offset the wear of the advancing edges.

It is believed to be evident from the foregoing description that the cutters 4 provide a means for slicing a series of layers from a board as they are mounted on a cutter head that carries a series of the cutters in the manner previously described. Except at the nose 13 of the cutter 4, the cutting action is substantially in a plane leaving the board surface finished smooth enough for sanding. The chips removed are of a good size to use as raw material for paper pulp without further treatment. The slicing action of the cutters rotating across the grain of the wood on an upright axis with respect to the surface planed, avoids splitting along the grain, even around knots where the grain is usually curved. The nose 13, in combination with the upward incline of the cutter toward the rear of the cutter and the inward sweep of the nose portion 13 from front to back of the cutter, serves to throw the chips out from the cutter head so they can drop into the hopper 16 and be conveyed away without using suction devices to keep the cutters clear.

Figure 10:
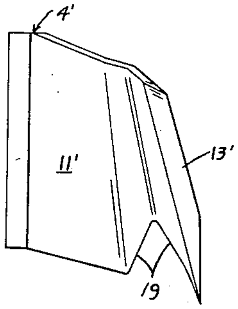
Figure 10 is a plan view of a modified cutter.
Figure 11:
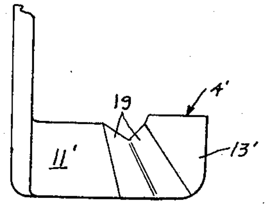
Figure 11 is a front view of the cutter shown in Figure 10.
Figure 12:
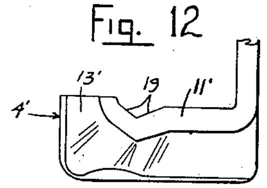
Figure 12 is a rear view of the cutter shown in Figure 10.
Figure 13:
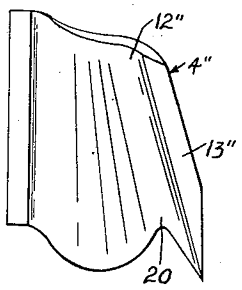
Figure 13 is a plan view of another form of cutter.
Figure 14:
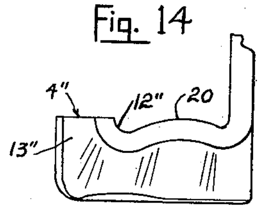
Figure 14 is a rear view of the cutter shown in Figure 13.
Figure 15:
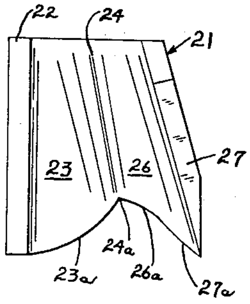
Figure 15 is a plan view of another form of cutter.
Figure 16:
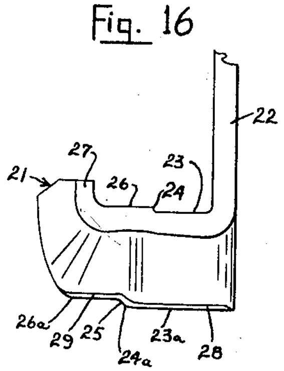
Figure 16 is a rear view of the cutter shown in Figure 15.

The cutter 4 may be varied in shape and still retain the essential slicing edges as is illustrated by the modifications in Figures 10 to 16 inclusive. These modifications embody the features that provide the slicing action of the cutter and the parts that cooperate to lift and discharge the chips. In Figures 10 to 12, the portion 19 of the cutter 4' is made V-shaped instead of curved as the part 12 in the main form of the cutter. The portions 11' and 13' are essentially the same as in the main form of the cutter. In Figures 13 and 14, an upwardly bowed portion 20 on the cutter 4'' is used instead of the portion 11 of the main form of the cutter 4. The portions 12'' and 13'' are the same as in the main form of the cutter 4. In Figures 15 and 16, the cutter 21 is made into a two stage cutter to take off two separate chips for each slice of a cutter across the board. The cutter 21 has an upwardly bowed portion 23 extending laterally from the shank 22. At the outer, lowest extremity of the bowed portion 23, a sharply upwardly and outwardly inclined ledge 24 is provided on the top surface of the cutter 21 and the bottom surface is rounded as indicated at 25. Outwardly of the ledge 24, the top surface 26 is substantially straight but inclined upward slightly to a nose 27 which is curved upwardly as in the main form of the invention. In grinding the clearance faces of the cutter 21, the surface 28 is flat with a slight rearward rise providing a convex forward edge 23a. Outwardly beneath the surface 26, a clearance surface 29 is ground which is flat but raised above the level of the surface 28. With this construction the advancing edges 23a and 24a, 26a and 27a cut two slices from the board each time a cutter 21 passes over it. This cutter 21 is desirable where the chips should be of less thickness than the total thickness to be cut from the board. The relative distances across the edges 23a and 26a determine the lengths of the chips.

In Figures 17–19 another form of the cutter is shown. In this form the cutter 30 has a base portion 31 that extends outwardly and downwardly from the inner edge 32. A nose portion 33 curves upwardly from the outer part of the portion 31 and is inclined outwardly with respect to the axis of the head on which it is mounted from the portion 31 to its top edge. The cutting edge 31a of the portion 31 recedes toward the junction with the nose portion 33 where the cutting edge 33a curves forwardly and upwardly to accomplish the advance cutting at the junction with the nose. At the front of the edge 33a the nose edge 33b extends upwardly and forwardly. The bottom of the cutter is ground off flat as shown at 34, at an angle to the bottom surface thereof, as shown by Figure 18, to form the cutting edges 31a and 33a. The nose 33 is ground along a plane surface, as shown at 35, to form the cutting edge 33b. The surfaces 34 and 35 are ground at the proper angle to provide the adequate clearance described hereinbefore, for advancement of the cutter across the moving board. With this form of the cutter the sharpening is simplified since only two plane faces have to be ground down to sharpen the cutter.

It is believed that the nature of my invention will be clear from the foregoing description.

Having thus described my invention, I claim:

1. A cutter for planing wood adapted to be moved across a board as the board is advanced to slice layers of predetermined thickness from a surface of the board, said cutter comprising a body portion having a front cutting edge embodying a plurality of non parallel front edge portions lying in a plane determining the thickness of a layer sliced from the board and an upturned nose having a cutting edge leading the front edge portion adjacent to the nose whereby to sever the layer at its end from the board surface in advance of completion of the slicing of the layer from the board along said plane.

2. A cutter for planing wood adapted to be moved across a board as the board is advanced to slice layers of predetermined thickness from a surface of the board, said cutter comprising a body portion having a front cutting edge lying in a plane determining the thickness of a layer sliced from the board and an upturned nose having a cutting edge leading the front edge portion adjacent to the nose whereby to sever the layer at its end from the board surface in advance of completion of the slicing of the layer from the board along said plane.

3. A cutter for planing wood adapted to be moved across a board as the board is advanced to slice layers of predetermined thickness from a surface of the board, said cutter comprising a body portion having a front cutting edge lying in a plane determining the thickness of a layer sliced from the board and an upturned nose having a cutting edge leading the front edge portion adjacent to the nose whereby to sever the layer at its end from the board surface in advance of completion of the slicing of the layer from the board along said plane, the cutter having a top surface inclining upwardly from the front cutting edge toward the rear and said top surface being depressed adjacent to the upturned nose.

4. A cutter for planing wood adapted to be moved across a board as the board is advanced to slice layers of predetermined thickness from a surface of the board, said cutter comprising a body portion having a front cutting edge lying in a plane determining the thickness of a layer sliced from the board and an upturned nose having a cutting edge leading the front edge portion adjacent to the nose whereby to sever the layer at its end from the board surface in advance of completion of the slicing of the layer from the board along said plane, the cutter having a top surface inclining upwardly from the front cutting edge toward the rear and said top surface being depressed adjacent to the upturned nose, then bowed upwardly between the depressed portion and the side of the cutter remote from said nose.

5. A cutter for planing wood adapted to be moved across a board as the board is advanced to slice layers of predetermined thickness from a surface of the board, said cutter comprising a body portion having a front cutting edge embodying a plurality of non parallel front edge portions lying in a plane determining the thickness of a layer sliced from the board, a second front cutting edge outwardly of said first named cutting edge lying in a plane parallel to but spaced from the first named plane and an upturned nose having a cutting edge leading the last named cutting edge, whereby to sever two layers from the board surface each time a cutter passes across the board.

References Cited in the file of this patent

UNITED STATES PATENTS

| | | |
|---|---|---|
| 227,407 | Bertermann | May 11, 1880 |
| 591,039 | Harris | Oct. 5, 1897 |
| 799,124 | Westman | Sept. 12, 1905 |
| 1,315,734 | Mattison | Sept. 9, 1919 |
| 1,472,960 | Conklin | Nov. 6, 1923 |
| 1,576,676 | Ruble | Mar. 16, 1926 |
| 1,935,337 | Sprague | Nov. 14, 1933 |
| 2,036,145 | Jewett | Mar. 31, 1936 |
| 2,884,031 | Standal | Apr. 28, 1959 |